Sept. 26, 1967     I. RUBIN     3,344,334
PHOTOVOLTAIC CELL BATTERY CHARGER
Filed May 20, 1965     2 Sheets-Sheet 1
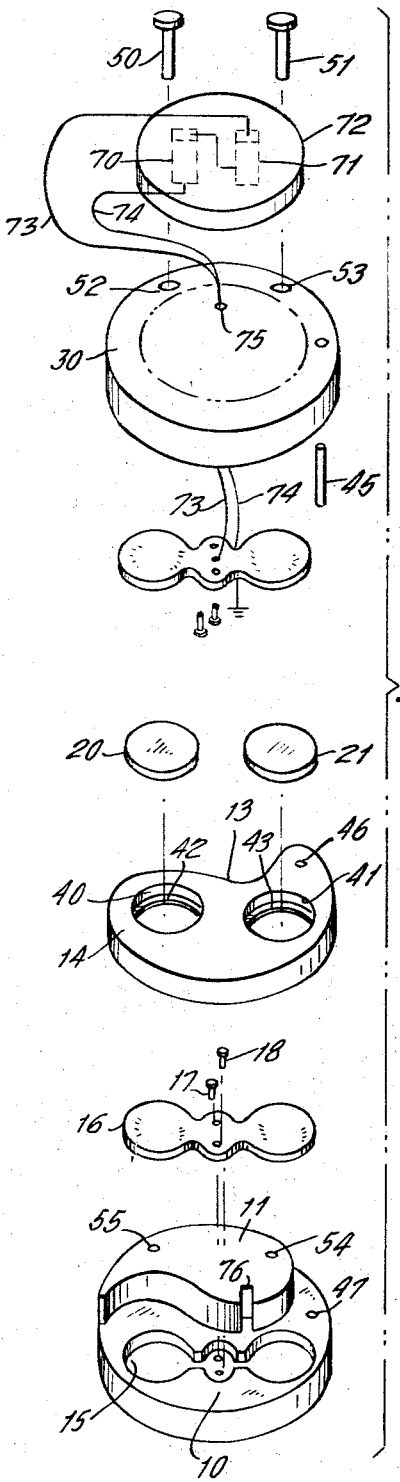
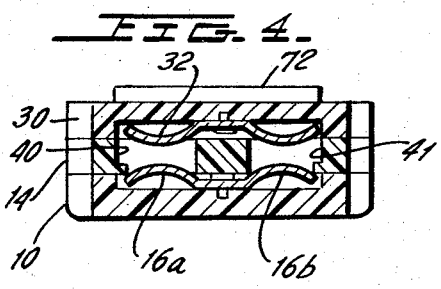
INVENTOR.
IRWIN RUBIN
BY
OSTROLENK, FABER, GERB & SOFFEN
ATTORNEYS Sept. 26, 1967  I. RUBIN  3,344,334
PHOTOVOLTAIC CELL BATTERY CHARGER
Filed May 20, 1965  2 Sheets-Sheet 2
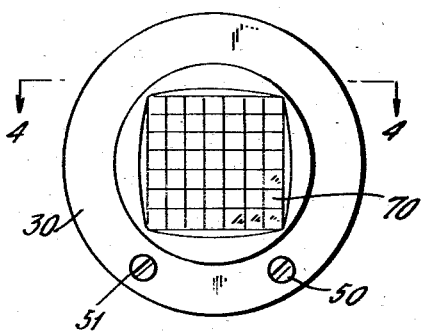
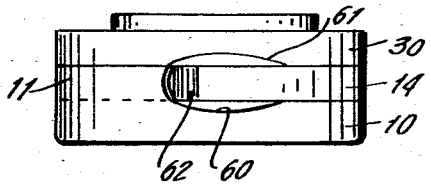
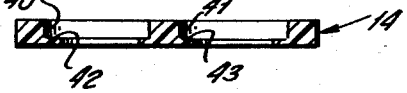
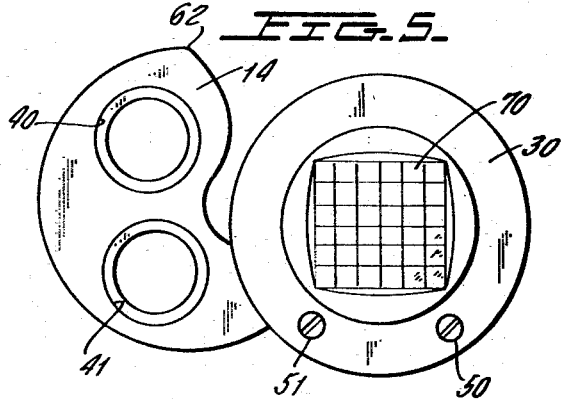
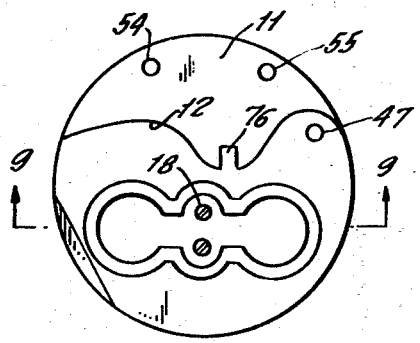
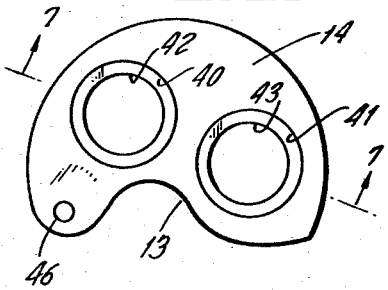
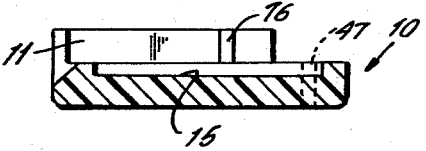
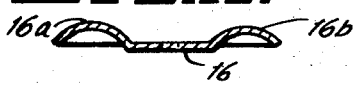
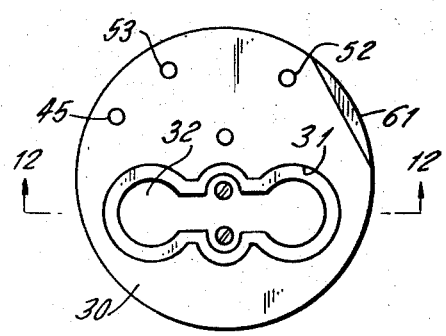
INVENTOR.
IRWIN RUBIN
BY
OSTROLENK, FABER, GERB & SOFFEN
ATTORNEYS United States Patent Office 3,344,334
Patented Sept. 26, 1967

3,344,334
PHOTOVOLTAIC CELL BATTERY CHARGER
Irwin Rubin, Sherman Oaks, Calif., assignor to International Rectifier Corporation, El Segundo, Calif., a corporation of California
Filed May 20, 1965, Ser. No. 457,323
3 Claims. (Cl. 320—2)

ABSTRACT OF THE DISCLOSURE

A portable battery charger having a pivotally mounted platform which contains openings for supporting batteries to be charged. The platform is pivoted into and out of a casing which carries contacts on its inner surfaces. When the platform is moved inwardly, electrical contact is made to the opposite terminals of the battery. An exterior solar cell connected to the fixed contacts causes a flow of charging current into the battery when the cells are exposed to radiation.

---

This invention relates to a novel battery charger, and more specifically relates to a novel structure for charging small hearing-aid type batteries which have a general wafer shape wherein the batteries are charged by the output power of a photovoltaic cell.

Hearing-aid type batteries of the rechargeable type are well known wherein the batteries will have thicknesses of the order of 1/8" and diameters from 1/4" to 1". When such batteries are discharged, they are generally disposed of, since charging equipment for such batteries is not generally available. Moreover, since the batteries are generally employed in portable equipment, it is often inconvenient to provide standard stationary battery charging equipment for recharging such batteries.

The principle of the present invention is to provide a novel portable light-weight battery charging unit for this type of rechargeable battery in which the source of power for the battery charging operation is derived from photovoltaic cells such as silicon solar cells. In particular, a novel structural arrangement is provided for a novel portable light-weight unit which is composed of an upper and lower housing which carry suitable internal and opposing pressure terminals for engaging the opposite surfaces of a rechargeable battery, with these terminals connected to a suitable photovoltaic source which is carried on the upper surface of the assemblage.

A central plate is then movably mounted between the upper and lower housing portions and, for example, is pivotally connected between these housing portions so that the plate can swing into and out of the housing. This plate then has one or more openings therein which can receive a rechargeable battery in such a manner as to expose its opposing surfaces, whereby batteries can be loaded into the plate when the plate is pivoted out of the two opposing housing portions while the opposing battery surfaces are brought into engagement with the pressure terminals of the upper and lower housing portions when the plate is moved into the housing. Thereafter, the novel portable charger is then exposed to any suitable source of radiation, whereupon the photovoltaic cells will generate an output current which will charge the rechargeable batteries connected between the output terminals of the cell.

Accordingly, a primary object of this invention is to provide a novel battery charger particularly adapted for hearing-aid type rechargeable batteries.

Another object of this invention is to provide a novel portable light-weight battery charger which is energized by the output of photovoltaic cells.

A still further object of this invention is to provide a novel arrangement for a portable battery charger which provides simplified means for the loading of rechargeable batteries therein.

Yet another object of this invention is to provide a novel portable light-weight battery charger for small rechargeable batteries.

These and other objects of this invention will become apparent from the following description when taken in connection with the drawings, in which:

FIGURE 1 is an exploded perspective view of the novel battery charger of the invention.

FIGURE 2 is a top plan view of the assembled device of FIGURE 1.

FIGURE 3 is a side plan view of FIGURE 2.

FIGURE 4 is a cross-sectional view of FIGURE 2 taken across the line 4—4 in FIGURE 2.

FIGURE 5 is similar to FIGURE 2 and illustrates the pivotally mounted loading platform swung outwardly to receive batteries.

FIGURE 6 is a top view of the loading platform.

FIGURE 7 is a cross-sectional view of FIGURE 6 taken across the line 7—7 in FIGURE 6.

FIGURE 8 is a top view of the lower housing portion of the device.

FIGURE 9 is a cross-sectional view of FIGURE 8 taken across the line 9—9 in FIGURE 8 with terminal of FIGURE 8 removed.

FIGURE 10 is a cross-sectional view of a typical pressure terminal shown in FIGURE 8 in plan view.

FIGURE 11 is a plan view of the inner surface of the upper housing portion of the assembly.

FIGURE 12 is a cross-sectional view of FIGURE 11 taken across the line 12—12 in FIGURE 11.

Referring now to the drawings, the novel battery charger of the invention is composed of a main lower housing portion 10, shown in FIGURES 1, 4, 8 and 9, which may be of any suitable insulation material such as a clear lucite-type plastic or polyethylene, or the like.

The lower housing portion 10 has a raised platform section 11 which has a generally S-shaped shoulder 12, best shown in FIGURES 1 and 8, which cooperates with a similarly configured edge portion 13 of a rotatable platform 14 which will be described more fully hereinafter.

The housing portion 10 then has a generally bell-shaped recess 15 therein which receives a generally bell-shaped pressure spring 16 therein as by screws 17 and 18 (FIGURES 1 and 8) which pass through the central portion of spring 16 to secure it within recess 15. The spring 16 is shown in cross-section in FIGURE 10 and comprises two raised sections 16a and 16b which, as will be seen more fully hereinafter, serve to engage the bottom surfaces of the hearing-aid type rechargeable batteries 20 and 21, respectively, in FIGURE 1.

It is to be noted from FIGURE 4 that the spring portions 16a and 16b project somewhat above the flat surface of housing portion 10 so that when the platform 14, which carries the batteries 20 and 21, moves adjacent platform 10, a pressure engagement will be created between the battery surfaces and the spring portions 16a and 16b. The upper housing portion 30 is then formed of a material similar to that of the lower housing portion 10. The interior surface of housing portion 30 is illustrated in FIGURE 11 and includes a depression 31 similar to bell-shaped depression 15 in upper housing portion 11 which receives a bell-shaped spring 32 which is identical to spring 16 of FIGURES 8 and 10.

The movable platform 14 is then interposed between the upper and lower housing portions 10 and 31, and is provided with one or more openings such as the openings 40 and 41 which extend therethrough and which have suitable internal shoulders 42 and 43, respectively, to provide small peripheral platforms for the reception of hearing-aid type rechargeable batteries 20 and 21. That is to say, it is now possible to drop the batteries 20 and 21 into openings 40 and 41 with the batteries held in position by the retaining shoulders 42 and 43 which prevent the batteries from passing completely through the openings.

The platform 14 is arranged to have relative movement with respect to upper and lower housing portions 10 and 30 and in the preferred embodiment of the invention described herein the platform is pivotally mounted with respect to these housing portions. Thus, a pivot pin 45 is rigidly fastened to the upper housing portion 30 in any desired manner with this pin passing through the opening 46 at one end of platform 14, and then into a seating opening 47 in the lower housing portion 10. The upper and lower housing portions are then rigidly secured together as by screws 50 and 51 which pass through aligned openings 52 and 53, respectively, in upper housing 30 and threaded openings 54 and 55, respectively, in the lower housing portion 10.

The central platform 14, however, is pivotally mounted within the two housings, and has a thickness substantially equal to the height of platform 11 so that the platform 14 may be rotated into and out of the assemblage as when going from the position of FIGURE 2 where the platform periphery is coextensive with the external periphery of the upper and lower housing portions to the position of FIGURE 5 where the openings 40 and 41 of the platform 14 are exposed for loading of batteries.

It is to be specifically noted that when the platform 14 is rotated into the housing, the batteries 20 and 21 of FIGURE 1 carried within openings 40 and 41 will be directly interposed between the projecting sections of springs 16 and 31 so that these two springs electrically connect batteries 20 and 21 in parallel with one another.

In order to provide a simplified means for gripping the platform 14 to move it to an open position and, as shown in FIGURES 3, 8 and 11, the lower housing portion may have a chamfered edge 60, while the upper housing portion may have a chamfered edge 61, with these chamfered edges defining a means for gripping the end portion 62 of platform 14, thereby permitting the manual movement of the platform to its open position.

The source of energy for charging the batteries 20 and 21 is then provided by way of a suitable photovoltaic generating cell means which could, for example, be comprised of silicon solar cells having the typical dimension of 1 centimeter by 2 centimeters with two such cells connected in series, such as the series connected cells 70 and 71, shown in FIGURE 1. These cells are then mounted within a suitable plastic diffusion lens arrangement 72 with the assembly secured to the top of the upper housing portion 30, as shown in FIGURES 1, 2, 4, 5 and 12. Alternatively, the cells 70 and 71 can be mounted directly on top of the housing 30 with lens 72 snapping over the cells and into a cooperating depression in housing 30.

The output leads 73 and 74 of cells 70 and 71 may be taken directly from the bottom of the diffuser 72 through an opening 75 in the upper housing 30, as shown in FIGURE 1. The negative lead 73 is then secured as by soldering to the spring contact 32, while the positive lead 74 extends downwardly and preferably through a notch 76, shown in FIGURES 1 and 8, to the center of the spring contact 16 where it is secured by soldering.

The completely assembled device will then be so arranged that when the batteries 20 and 21 are loaded into the platform 14, and the platform 14 rotated into the opposing housing portions, a circuit will be completed to pass charging current through the batteries 20 and 21 when the solar cells or photovoltaic generating cell means is activated, due to incident radiation falling thereupon. Thus, the cells are easily charged with the charging current decreasing toward zero as the voltage of the batteries increases in opposition to the output voltage of the cells, thus preventing overcharging of the batteries.

In the foregoing, the invention has been described preferably for use with a relatively flat type of battery generally found in hearing-aid apparatus. Clearly, however, the apparatus illustrated in FIGURES 1 through 12 could be simply modified for application to elongated type of batteries such as the commonly known flashlight battery by increasing the length of the platform 14.

Moreover, while the platform 14 has been shown to receive two batteries, it will be clear that the spring contacts 16 and 30 could be suitably modified for the reception of any desired number of batteries to be charged in parallel with a single loading.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A battery charger comprising an upper housing portion, a lower housing portion spaced from said upper housing portion, a generally flat central platform movable in a plane parallel to the plane of said central platform from a first position between said upper and lower housing portions to a second position removed from between said upper and lower housing portions, a source of charging current and a first and second terminal for said source of charging current; said upper and lower housing portions having opposing surfaces; said opposing surfaces having first and second respective flexible spring conductors connected thereto; said first and second terminals of said source of charging current electrically connected to said first and second flexible spring conductors respectively; said central platform having at least a first opening therethrough for the reception of a rechargeable battery having a disk shape with opposite terminals on the opposite surfaces of said disk shape; the opposite sides of said opening registering with said first and second flexible spring conductors respectively when said platform is moved between said upper and lower housing portions whereby a battery contained within said opening is connected between said flexible spring connectors when said platform is moved between said upper and lower housing portions; said opening being exposed for access when said platform is moved to its said second position; said central platform being pivotally mounted at a single pivot point between said upper and lower housing portions and rotatable about said single pivot point between its said first and second positions; said source comprising a photovoltaic generator means mounted on said upper housing portion.

2. The device substantially as set forth in claim 1 wherein said platform includes a plurality of openings therethrough; each of said first and second flexible spring conductors having a plurality of engagement portions for each of said openings.

3. The device substantially as set forth in claim 1 wherein said lower platform has an extending shoulder portion engaging the opposing inner surface portion of said lower housing; said central platform having an edge portion engaging the edge of said shoulder portion when said platform moves to its said first position.

References Cited

UNITED STATES PATENTS

| | | | |
|---|---|---|---|
| 2,919,353 | 12/1959 | Paradise | 320—2 X |
| 3,138,491 | 6/1964 | Rubio | 136—173 |
| 3,143,697 | 8/1964 | Springer | 320—2 |

JOHN F. COUCH, *Primary Examiner.*

S. WEINBERG, *Assistant Examiner.*